(12) United States Patent
Miyazaki et al.

(10) Patent No.: US 6,285,402 B1
(45) Date of Patent: Sep. 4, 2001

(54) DEVICE AND METHOD FOR CONVERTING SCANNING

(75) Inventors: Shinichiro Miyazaki; Makoto Kondo, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/214,886

(22) PCT Filed: May 11, 1998

(86) PCT No.: PCT/JP98/02065

§ 371 Date: Jan. 14, 1999

§ 102(e) Date: Jan. 14, 1999

(87) PCT Pub. No.: WO98/52183

PCT Pub. Date: Nov. 19, 1998

(30) Foreign Application Priority Data

May 16, 1997 (JP) .................................................. 9-126940

(51) Int. Cl.[7] .............................. H04N 5/04; H04N 7/01; H04N 11/20
(52) U.S. Cl. ......................... 348/445; 348/441; 348/444; 348/458; 348/540
(58) Field of Search ...................................... 348/441, 443, 348/444, 445, 458, 459, 511, 536, 540, 542, 543, 554, 556, 581, 704; H04N 7/01, 11/20, 5/04

(56) References Cited

U.S. PATENT DOCUMENTS 5,227,882 * 7/1993 Kato ...................................... 358/160
5,657,089 * 8/1997 Onagawa .............................. 348/537
5,786,863 * 7/1998 Collins .................................. 348/458
5,812,210 * 9/1998 Arai et al. ............................ 348/555
5,905,536 * 5/1999 Morton et al. ....................... 348/441
5,907,364 * 5/1999 Furuhata et al. .................... 348/459
5,912,711 * 6/1999 Lin et al. .............................. 348/446
6,020,927 * 2/2000 Tanaka et al. ....................... 348/458

OTHER PUBLICATIONS

JP, 6-138834, A (Matsushita Electric Industrial Co., Ltd.), May 20, 1994.
JP, 6-6631, A (Canon Inc.), Jan. 14, 1994.
JP 4-360194, A (Toshiba Corp.), Dec. 14, 1992.
JP, 8-186801, A (Victor Co. of Japan, Ltd.), Jul. 16, 1996.
JP, 8-116470, A (NEC Corp.), May 7, 1996.
JP, 7-336593, A (Fujitsu General Ltd.), Dec. 22, 1995.

* cited by examiner

Primary Examiner—Reinhard J. Eisenzopf
Assistant Examiner—Brian P. Yenke
(74) Attorney, Agent, or Firm—Frommer, Lawrence & Haug LLP; William S. Frommer; Darren M. Simon

(57) ABSTRACT

An input image signal is converted into a digital form in an A/D converter 6 by clock pulses 53 from VCO 4 of a PLL circuit 1. The frequency of the clock pulses 53 is fixed. After the number of scanning lines is converted in a primary processing circuit 7, the digital image signal is written in field memory 10. The image signal is read out from the field memory 10 by second clock pulses 63 generated in a PLL circuit 11. A frequency divider 15 in the PLL circuit 11 is changed in frequency division ratio by a control signal. As a result, the sampling number in one horizontal period of the image signal read out from the field memory 10 is changed. Since the number of pixels in the effective image period of the image signal written in the memory is constant, by changing the sampling number in one horizontal period on the read-out side, the ratio of the effective image period relative to one horizontal period can be changed to adjust the horizontal size.

5 Claims, 5 Drawing Sheets

DEVICE AND METHOD FOR CONVERTING SCANNING

TECHNICAL FIELD

This invention relates to a scan converting device and a scan converting method for converting horizontal scanning frequency of computer display signals and input image signals of high fidelity television sets, and more particularly, to a device and a method enabling horizontal size adjustment in addition to scan conversion.

BACKGROUND ART

Recent image signal sources range over a variety of sorts. Especially in computer displays, many kinds of scanning frequencies are used, and there are cases using a plurality of scanning frequencies in a single computer. Therefore, display apparatuses are required to have a multi-scanning deflection system. On the other hand, display screens have come to diversify in size. Especially, the demand for large-scale displays is increasing progressively, and display of computer signals by a large-scale projector has become active.

However, if the multi-scanning system is employed in a large-scale display apparatus, a lot of problems must be overcome, because of the deflection circuit being complex and the cost of component parts being high, and from the viewpoint of ensuring the reliability against an increase in temperature inside the device, among others. An existing scheme is to fix the deflection frequency to a single frequency, such as 60 Hz/31.5 kHz, and to process and convert various sorts of image signals into image signals of the single scanning frequency.

An example of such systems is schematically shown in FIG. 1. Introduced into a frequency converter 40 are three kinds of image signals different in scanning frequency, for example, ordinary NTSC signal (field frequency 59.9 Hz and horizontal scanning frequency 15.734), SVGA computer signal whose field frequency ranges from 50 Hz to 70 Hz and whose horizontal scanning frequency ranges from 35 kHz to 50 kHz, and HDTV signal having the field frequency of 60 Hz and the horizontal scanning frequency of 33.75 kHz. The frequency converter 40 converts the input image signals into image signals of a single scanning frequency 60 Hz/35.5 kHz, and supplies these image signals to a display apparatus.

Nowadays, display apparatuses using pixel-fixed devices are prevailing widely. Since the number of pixels is fixed, they need scanning conversion when displaying image signals of various modes. FIG. 2 shows a system in which an NTSC signal with 240 scanning lines, SVGA signal with 600 scanning lines and HDTV with 518 scanning lines are scan-converted by a frequency converter 40. Scan-converted image signals are displayed on a display apparatus, such as plasma display apparatus, having fixed pixels of 640 dots by 480 lines.

Next explained is a process of scan conversion by the frequency converter 40. FIG. 3 is a block diagram showing a main construction for scan conversion which has been used to date. The "scan conversion" pertains to converting, for example, a SVGA signal (800 pixels by 600 lines) into a VGA signal (640 pixels by 480 lines).

As shown in FIG. 3, an input image signal 50 is converted into a digital signal by an A/D converter 26, and provisionally stored in a field memory 20 which is configured to write data of the effective image period in one horizontal (1H) period. An independent sync signal asynchronous with the input image signal 50 is created from clock pulses 62 by a sync signal generator 38. An image signal is read out from the field memory 20 by clock pulses 62, and it is converted into an analog signal by a D/A converter 36. A primary processing circuit 27 is provided on the write side of the field memory 20, and a secondary processing circuit 37 is provided on the read side thereof.

The A/D converter 26, in which the sampling frequency is determined appropriately, executes A/D conversion so that one horizontal period be a predetermined number of sampling, for example, 800, and the effective pixels in one horizontal period be 640 pixels. The primary processing circuit 27 conducts vertical interpolation processing to convert, for example, 600 lines into 480 lines. The secondary processing circuit 37 adds a horizontal sync signal and a vertical sync signal.

A PLL circuit 21 is provided to generate a sampling clock for the A/D converter 26. The PLL circuit 21 includes a phase comparator 22, low pass filter (LPF) 23, voltage control oscillator (hereinafter abbreviated to VCO) 24, and frequency divider 25. The PLL circuit 21 generates a clock pulse 52 synchronous with the horizontal sync signal 51 of the input image signal 50. A/D conversion or other processing prior to clock re-riding is conducted by the clock pulse 52. The secondary processing circuit 37 uses a clock pulse 62 output from a free-run clock generator 39. The clock generator 39 is a quarts oscillator which stably generates clock pulses. The output side sync signal is made in the sync signal generator 38 by using the clock pulse 62, and does not synchronize with the input side sync signal.

The scan converting device explained above functions to adjust the horizontal size of the display screen. In case of display outputs of computers, not only the length of one horizontal period (horizontal frequency) but also the length of the effective image period in one horizontal period are inconstant. Therefore, in outputs from the A/D converter 26, the number of pixels corresponding to the effective image period is not always a predetermined number (for example, 640). As a result, when an output image signal is displayed on the display apparatus, the display apparatus often fails to display the full extent of the effective image period but often drops edge portions thereof. Since representation of panels, icons, and so fourth, typically lies along edges of computer displays, failure to represent these things degrades the manipulative performance. To overcome the problem, computer displays are configured to permit a user to appropriately adjust the horizontal width of the display screen in addition to the scan conversion. This adjustment is called horizontal size adjustment.

In beam deflection systems like a CRT display as shown in FIG. 1, the horizontal size is adjustable by adjusting the amplitude of horizontal deflection. However, pixel-fixed displays like that shown in FIG. 2 cannot use the same method for horizontal size adjustment, and relies on signal processing for horizontal size adjustment. CRT displays using beam deflection can employ horizontal size adjustment by signal processing as well.

The scan conversion device shown in FIG. 3 can adjust the horizontal size. More specifically, by introducing an external UP/DOWN signal increasing or decreasing the frequency division ratio into the frequency divider 25 and by changing the ratio of oscillation frequency of VCO 24 relative to the horizontal scanning frequency of the input image signal, the number of sampling in one horizontal period of the input image signal can be changed. On the other hand, the number of sampling in one horizontal period at the output side (read-out side) is held always constant. For example, if the frequency division ration of the frequency divider 25 is 1/800, then the number of sampling of one horizontal period of the input image signal is 800. If the frequency division ration is made larger than 1/800, the frequency of the sampling clock becomes high, the number of sampling of one horizontal period becomes larger than 800, and the number of pixels in the effective image period increases.

In this manner, in the construction shown in FIG. 3, the number of pixels in the effective screen relative to the sampling number of one horizontal period is changed by adjusting the frequency of the sampling clock of the A/D converter 26. As a result, the length of the effective image period relative to one horizontal period is changed, and the horizontal size can be adjusted correlatively.

This method for horizontal adjustment fixes the sampling number of one horizontal period on the output side always constant, and changes the number of pixels in the effective image period per one line of the input image signal. As a result, when the horizontal size is changed, the number of pixels relative to the effective screen of the input image signal also changes. That is, horizontal size adjustment invites a change in sampling point (sampling phase) for sampling by the A/D converter 26, and deteriorates the quality of images in case of signals with a high horizontal frequency (for example, signals of fine characters). Since typical computer signals are for representation of fine characters, this is a serious problem. Moreover, since the number of pixels in the effective screen changes, the field memory 20 for synchronous re-riding is required to have a much larger capacitance to allow for a margin beforehand.

It is therefore an object of the invention to provide a scan converting device and a scan converting method capable of horizontal size adjustment without deteriorating the quality of images on the display screen in a device configured to convert scanning frequencies for display of images.

DISCLOSURE OF THE INVENTION

To attain the object, there is provided a scan converting device for converting the scanning frequency for an analog input image signal and for outputting an image display signal, comprising:

a first PLL circuit for creating first clock pulses synchronous with the input image signal;

an A/D converter for converting the input image signal into a digital signal by using the first clock pulses;

memory for storing the digital output signal from the A/D converter;

a D/A converter for reading a digital signal corresponding to the input image signal from the memory and for converting it into an analog signal; and a second PLL circuit for creating second clock pulses for the D/A converter, the second PLL circuit having clock frequency variable means for changing the frequency of the second clock pulses, the horizontal size of a display screen being adjusted by changing the frequency of the second clock pulses by the clock frequency variable means and by accordingly changing the ratio of the effective image period relative to one horizontal period.

The scan converting device may further comprise a sync signal generating circuit for generating a vertical sync signal and a horizontal sync signal which are asynchronous with the input image signal, the second clock pulses being synchronous with the horizontal sync signal.

A frequency divider may be further provided for dividing an oscillation output of a voltage control oscillator of the second PLL circuit in frequency so as to obtain second clock pulses with a frequency corresponding to the frequency division ratio from the voltage control oscillator.

There is further provided a scan converting method for converting the scanning frequency for an analog input image signal and for outputting an image display signal, comprising:

converting the analog input image signal into a digital image signal by using first clock pulses synchronous with the input image signal;

storing the digital image signal in memory;

reading out the digital image signal from the memory; and converting the digital image signal read out from the memory into an analog signal, characterized in that, by changing the frequency of second clock pulses for reading and D/A conversion of the digital image signal to change the ratio of the effective image period relative to one horizontal period, the horizontal size is adjustable in accordance with the ratio.

According to the invention, when the horizontal size of the display screen is adjusted, the clock frequency read out from the field memory is changed. As a result, the sampling number in one horizontal period during reading is changed. However, the number of pixels in the effective image period in one horizontal period on the part of writing onto the field memory does not change. Therefore, the output image signal results in being controlled in ratio of the length of the effective image period in one horizontal period. That is, the horizontal size is adjusted. Since the image signal is digitalized in a constant sampling phase on the part of writing, quality deterioration of images due to changes in sampling phase can be prevented.

BEST MODE FOR CARRYING OUT THE INVENTION

Figure 1:
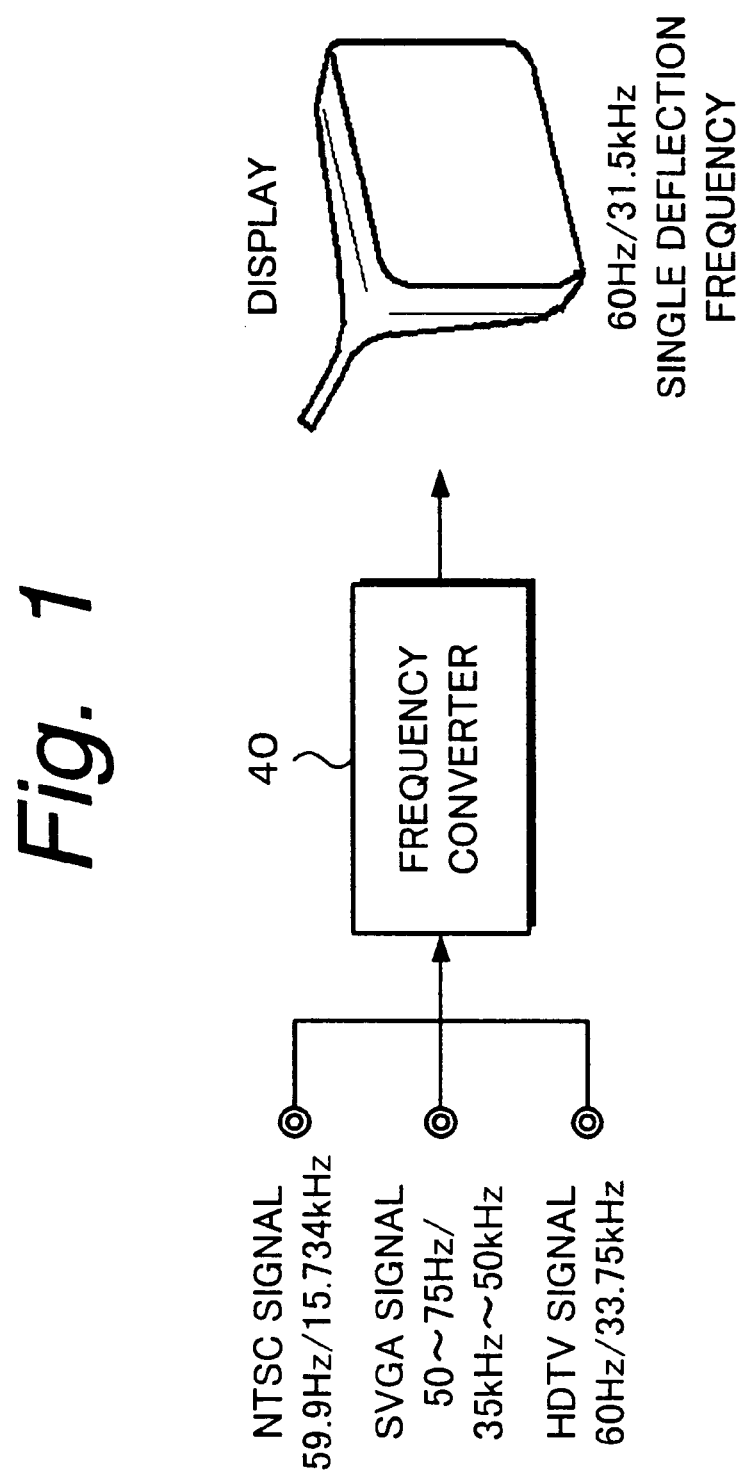
FIG. 1 is a block diagram illustrating a system for displaying a plurality of image signals by using a frequency converter.
Figure 2:
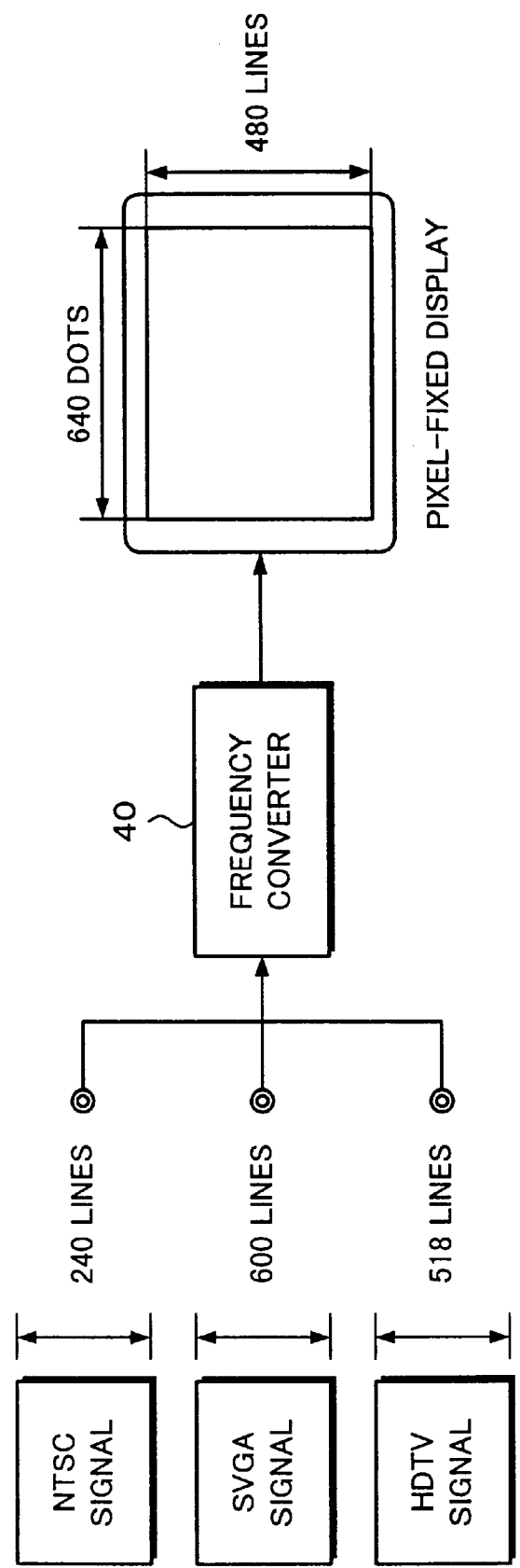
FIG. 2 is a block diagram illustrating a system a system using a display apparatus with a fixed number of pixels for displaying a plurality of image signal by using a frequency converter.
Figure 3:
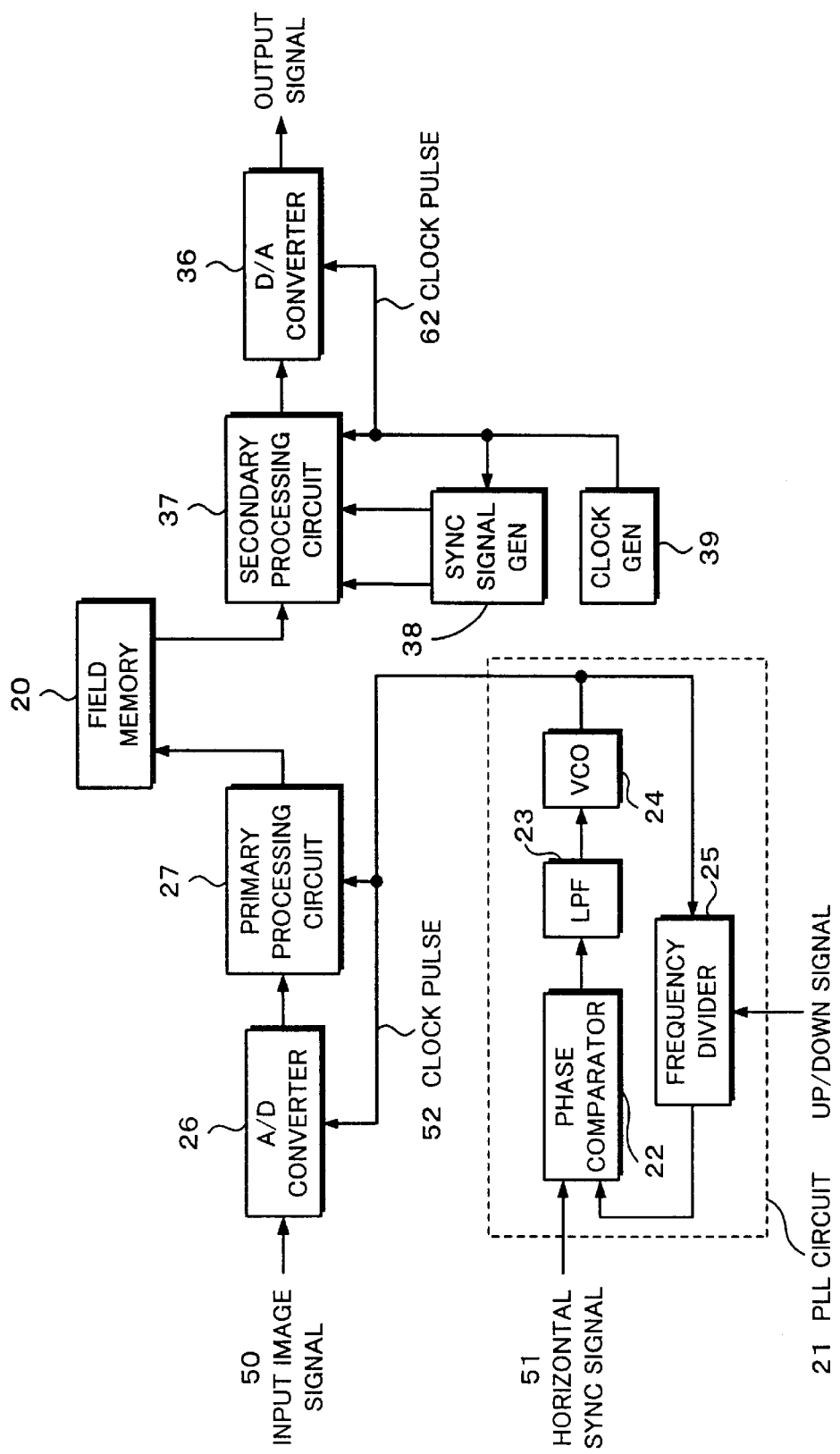
FIG. 3 is a block diagram showing a central construction of a conventional scan converting device.
Figure 4:
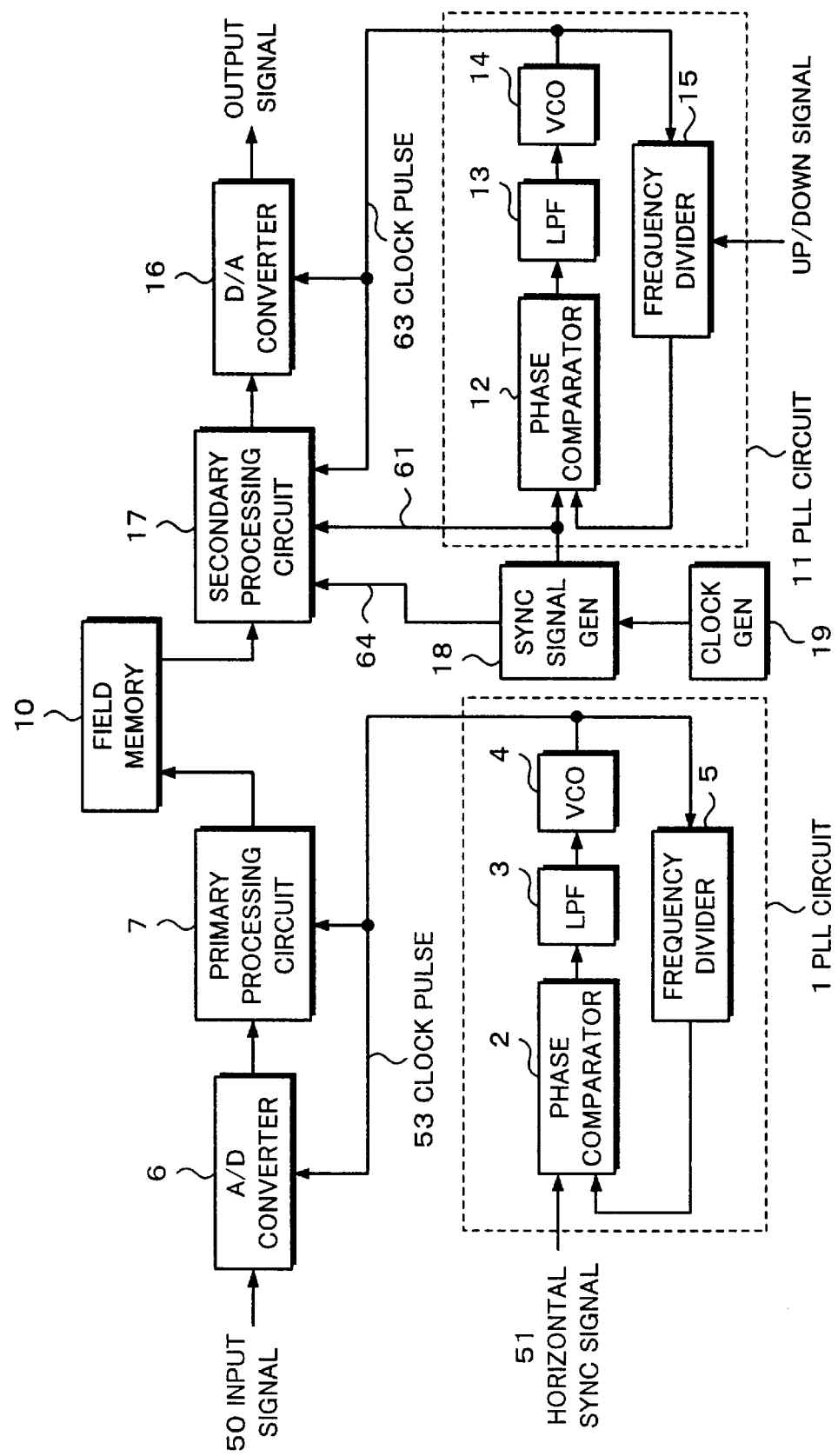
FIG. 4 is a block diagram showing a central construction of an embodiment of the scan converting device according to the invention.

Explained below is an embodiment of the invention in detail with reference to the drawings. FIG. 4 is a block diagram showing a central construction of a scanning line converting device taken as an embodiment of the invention. In the embodiment shown here, horizontal size of a display screen is adjusted by using a scan converting device.

As shown in FIG. 4, the scanning line converting device includes an A/D converter 6 for converting an input image signal into a digital form, PLL circuit 1 for creating clock pulses 53 for the A/D converter 6, field memory 10, D/A converter 16 for returning a signal read out from the field memory 10 into an analog form, PLL circuit 11 for creating clock pulses 63 used in the D/A converter 16, etc., sync signal generator 18 for creating a sync signal synchronous with the clock pulses 63, clock generator 19 for generating clock pulses which is the base of the sync signal, primary processing circuit 7 for converting the number of scanning lines, and secondary processing circuit 17 for adding sync signals.

The field memory 10 is configured to write data of the effective image period therein. However, it may be configured to store data of the entirety of one horizontal period.

PLL circuits 1 and 11 are widely used ones, each including a phase comparator 2 or 12, LPF 3 or 13, VCO 4 or 14 and frequency divider 5 or 15, and only the frequency divider 15 in the read-side PLL circuit 11 is externally adjustable in frequency division ratio. The frequency division ratio of the frequency divider 15 can be adjusted by supplying an UP signal for heightening the frequency division ratio or a DOWN signal for lowering it through a remote control signal, for example, to change the reset value in a counter (not shown) in the frequency divider 15.

The PLL circuit 1 creates a sampling clock for A/D conversion and also creates a clock for the primary processing circuit 7 and a write clock for the field memory 10. The PLL circuit 11 creates a read clock for the field memory 10, a clock for the secondary processing circuit 17, and a clock for D/A conversion.

Next explained are behaviors of the embodiment as introducing a personal computer signal as the input image signal 50.

First, the input image signal 50 is converted into a digital form by the A/D converter 6, then passed through the primary processing circuit 7, and provisionally stored in the field memory 10. It is read out with clock pulses 63 asynchronous with the horizontal sync signal 51 prior to conversion, and then passed through the secondary processing circuit 17, and returned to and output as an analog signal by the D/A converter 16.

In the embodiment shown here, computer signals with horizontal scanning frequencies from 31.5 kHz to 90 kHz are displayed on a display apparatus whose horizontal frequency (fixed) is 31.5 kHz. In this case, let the frequency division ration of the frequency divider in the PLL circuit 1 be a fixed value. The PLL circuit 1 divides an oscillation output of VCO 4 in frequency, and compares its phase with the horizontal sync signal 51 in the phase comparator 2, and feeds an error signal back to VCO 4 via LPF 3 to establish synchronization between clock pulses 53 and the horizontal sync signal 51.

The oscillation output from VCO 4 are used as clock pulses 53 for A/D conversion. For example, if a SVGA signal is converted into a VGA signal, the SVGA signal is digitalized so that the sampling number of one horizontal period be 800 and the number of pixels in the effective image period be approximately 640. Since the number of pixels may differ among input image signals, horizontal size adjustment is indispensable.

The block construction of the PLL circuit on the read-out side of the field memory 10 is the same as that of the PLL circuit 1; however, the frequency division ratio of the frequency divider 15 is variable. For example, the frequency division ratio has a variable range of $1/700$ to $1/1000$. The oscillation output from VCO 14 is counted down to the horizontal scanning frequency (for example, 31.5 kHz) by the frequency divider 15, then introduced into the phase comparator 12, and compared there in phase with a horizontal sync signal 61 generated by the sync signal generator 18 independently from the horizontal sync signal 51, and an error signal resulting from the comparison is fed back to VCO 14 via LPF 13.

Therefore, the oscillation output of VCO 14, i.e. clock pulses 63, are synchronous with the horizontal sync signal 61, but independent from the input-side horizontal sync signal 51. By reading out the image signal from the field memory 10 at a new timing made by the clock pulses 63 and a horizontal sync signal 61 and a vertical sync signal 64 generated by the sync signal generator 18, synchronous re-riding is executed.

The primary processing circuit 7 and the secondary processing circuit 17 are provided before and after the field memory 10. The primary processing circuit 7 performs conversion of the number of scanning lines whereas the secondary processing circuit 17 performs addition of sync signals. In the primary processing circuit 7 and the secondary processing circuit 17, filtering process may be added in order to prevent deterioration of the quality of images which may occur upon signal processing for analog or digital conversion.

The horizontal sync signal 61 and the vertical sync signal 64 created by the sync signal generator 18 based on the output pulses from the clock generator 19 are supplied to a deflection circuit system (not shown), or the like, which may be provided in the display apparatus, where necessary, to drive the display apparatus together with the output signal from the D/A converter 16 so as to display images on the display screen.

Next explained is horizontal size adjustment of the display screen executed by using the scanning line converter.

As explained above, in the embodiment shown here, the sampling number of one horizontal period upon A/D conversion of the input image signal 50 is always a constant value (800) because the frequency division ratio of the frequency divider 5 is $1/800$. In this case, the sampling point (sampling phase) for signals in the effective image period becomes a predetermined phase locked at the horizontal sync signal, and approximately 640 pixels exist in the effective image period in case of a VGA signal.

On the other hand, the sampling number of one horizontal period for reading from the field memory 10 can be changed in the range of 700 to 1000 by externally adjusting the frequency division ratio of the frequency divider 15 in the range of $1/700$ to $1/1000$. For example, by determining the frequency division ratio to $1/900$, the sampling number of one horizontal period for reading can be set in 900.

Since approximately 640 pixels corresponding to the effective image period are stored in the field memory 10, the number of pixels of the effective image period is constant. More specifically, when data of the effective image period is read out from the field memory 10, after approximately 640 pixels are read out in one horizontal period, invalid data of the remainder (900−640=260) samples results in existing in one horizontal period. If the frequency division ratio of the frequency divider 15 is $1/800$, then invalid data of (800−640= 160) samples exists in one horizontal period. In this manner, the ratio of pixels in the effective image period relative to the sampling number of one horizontal period varies. In other words, the ratio of. the effective image period and the blanking period in one horizontal period varies. This results in adjusting the horizontal size on the screen.

Figure 5A:
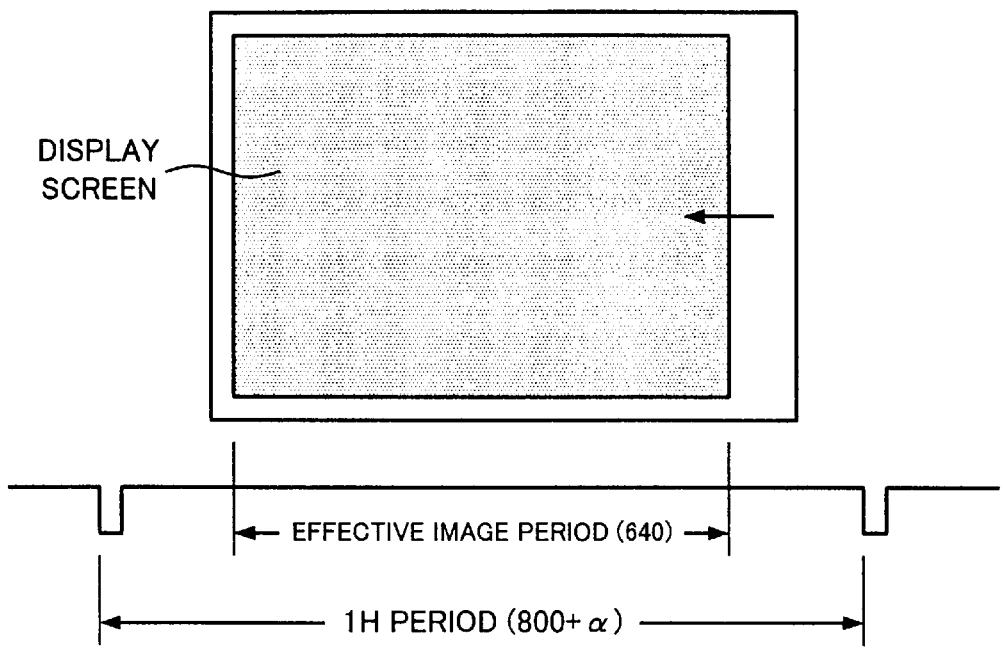
FIGS. 5A and 5B are schematic diagrams for explaining horizontal size adjustment according to an embodiment of the invention.

FIG. 5 schematically shows horizontal size adjustment according to an embodiment of the invention. FIG. 5A shows a case where the sampling number in one horizontal period on the output side is increased to 800+α by increasing the frequency division ratio of the frequency divider 15 than 1/800. In this case, the effective image period in one horizontal period becomes. relatively shorter, and the horizontal size becomes smaller accordingly.

Figure 5B:
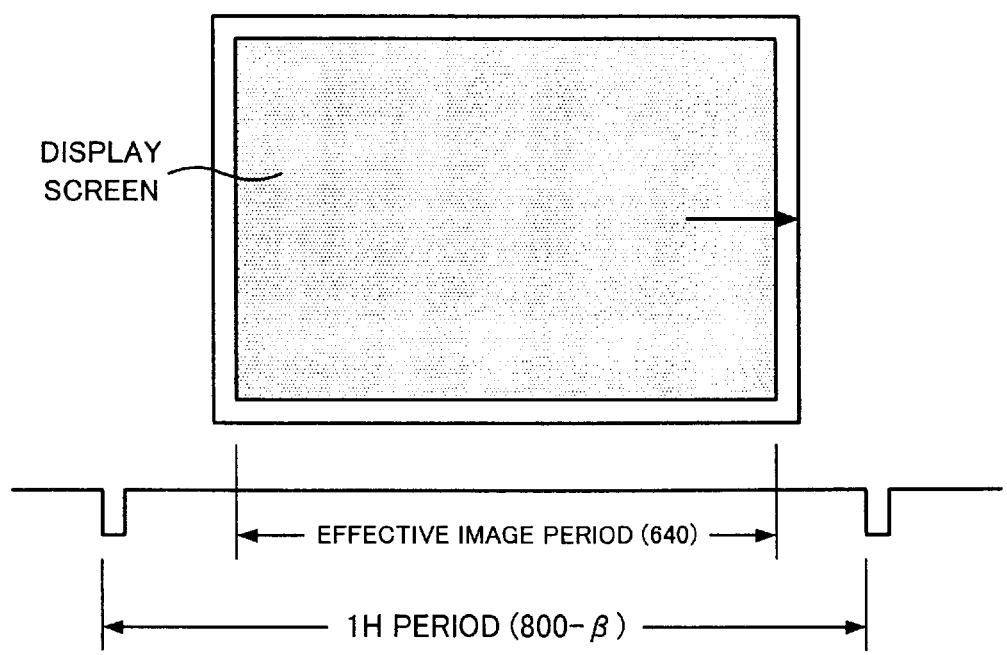

On the other hand, by decreasing the frequency division ration of the frequency divider 15 smaller than 1/800, the sampling number in one period on the output side can be decreased to 800−β as shown in FIG. 5B. In this case, since the effective image period becomes relatively longer in one horizontal period, the horizontal size can be enlarged. By horizontal size adjustment, any difference of the ratio of the effective image period relative to one period of the input image signal can be corrected, and the problem of failure to display edge portions on a screen can be prevented.

Even when the horizontal size is modified by changing the frequency division ratio in this manner, since the number of pixels in the effective image period in one horizontal period written in the field memory is constant, the sampling phase in the A/D converter 26 is fixed, and deterioration of the quality of images on the screen can be prevented even in the case of fine character signals.

The present invention is applicable to plasma displays, liquid crystal displays, liquid crystal projectors and CRT displays.

As described above, the invention enables signal processing for converting scanning frequencies and horizontal size adjustment while preventing deterioration of the quality images for image signals of a wide variety of horizontal scanning frequencies.

What is claimed is:

1. A scan converting device for converting the scanning frequency for an analog input image signal and for outputting an image display signal, comprising:

a first PLL circuit for creating first clock pulses synchronous with said input image signal;

an A/D converter for converting the input image signal into a digital signal by using said first clock pulses;

a primary processing circuit for processing said digital signal by vertical interpolation;

memory for storing the digital signal processed by said primary processing circuit;

a secondary processing circuit for reading the digital signal corresponding to said input image signal from said memory and for adding an asynchronous horizontal sync signal and an asynchronous vertical sync signal to the digital signal;

a second PLL circuit for creating second clock pulses and having clock frequency variable means for changing the frequency of said second clock pulses; and a D/A converter for converting the digital signal processed by said secondary processing circuit into said image display signal by using said second clock pulses; the horizontal size of said image display signal being adjusted by changing the frequency of said second clock pulses by said clock frequency variable means and by accordingly changing the ratio of the effective image period relative to one horizontal period.

2. The scan converting device according to claim 1 further comprising a sync signal generating circuit for generating a vertical sync signal and a horizontal sync signal which are asynchronous with said input image signal, said second clock pulses being synchronous with said horizontal sync signal.

3. The scan converting device according to claim 2 wherein said second PLL circuit includes a voltage control oscillator; a frequency divider for dividing an oscillation output of said voltage control oscillator in frequency, said frequency divider being variable in frequency division ratio; a phase comparator for comparing said horizontal sync signal and an output of said frequency divider in phase; and a low pass filter for supplying said voltage control oscillator with a low component in a comparison output signal from said phase comparator as a control signal, said second clock pulses with a frequency corresponding to said frequency division ratio being obtained from said voltage control oscillator.

4. The scan converting device according to claim 3 wherein said second clock pulses are changed in frequency by introducing into said frequency divider a first control signal for heightening the frequency division ratio or a second control signal for lowering the frequency division ratio.

5. A scan converting method for converting the scanning frequency for an analog input image signal and for outputting an image display signal, comprising:

creating first clock pulses synchronous with said analog input image signal;

converting the analog input image signal into a digital image signal by using first clock pulses synchronous with said input image signal;

processing said digital image signal by vertical interpolation;

storing the processed digital image signal in memory;

reading out said digital image signal from said memory;

adding an asynchronous horizontal sync signal and an asynchronous vertical sync signal to the digital image signal;

creating second clock pulses having a variable frequency; and converting the digital image signal into said image display signal by using said second clock pulses; the horizontal size of said image display signal being adjusted by changing the frequency of said second clock pulses and by accordingly changing the ratio of the effective image period relative to one horizontal period.

* * * * *